(12) United States Patent
Ju et al.

(10) Patent No.: US 7,342,691 B2
(45) Date of Patent: Mar. 11, 2008

(54) INKJET MULTI-FUNCTION MACHINE

(75) Inventors: Young-bok Ju, Seongnam (KR); Kyung-chool Choi, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 789 days.

(21) Appl. No.: 10/772,350

(22) Filed: Feb. 6, 2004

(65) Prior Publication Data

US 2004/0252141 A1 Dec. 16, 2004

(30) Foreign Application Priority Data

Jun. 13, 2003 (KR) .................... 10-2003-0038440

(51) Int. Cl.
*H04N 1/024* (2006.01)
*B41J 3/00* (2006.01)

(52) U.S. Cl. .......................... 358/472; 347/2
(58) Field of Classification Search .................. None
See application file for complete search history.

(56) References Cited

U.S. PATENT DOCUMENTS 5,812,172 A * 9/1998 Yamada ...................... 347/171
6,488,353 B1 * 12/2002 Itoyama et al. ............... 347/19
6,633,414 B1 * 10/2003 Matsuda et al. ............ 358/474

* cited by examiner

*Primary Examiner*—Twyler Haskins
*Assistant Examiner*—Marcus T. Riley
(74) *Attorney, Agent, or Firm*—Roylance, Abrams, Berdo and Goodman, LLP

(57) ABSTRACT

An inkjet multi-function machine having cooperating scanning and printing functions, and more particularly, an inkjet multi-function machine in which a scanner is engaged with a printing carriage to communicate common motion, in addition to providing scanning specific motions. The inkjet multi-function machine includes a scanner fixing unit having a scanner position adjuster for fixing and supporting the scanner, wherein the scanner is movable between a first rotational direction and elevated position for scanning a document, and a second rotational direction and elevated position for scanning a sheet of paper, wherein the scanner can move together with the carriage when the carriage moves, and at the same time, selectively move between the first and the second directions and elevated positions.

15 Claims, 6 Drawing Sheets

INKJET MULTI-FUNCTION MACHINE

CROSS-REFERENCE TO RELATED APPLICATIONS

This application claims the benefit of Korean Patent Application No. 2003-38440, filed on Jun. 13, 2003, in the Korean Intellectual Property Office, the disclosure of which is incorporated herein by reference.

BACKGROUND OF THE INVENTION

1. Field of the Invention

The present invention relates to an inkjet multi-function machine having scanning and printing functions, and more particularly, to an inkjet multi-function machine in which a scanner is installed on a carriage for reciprocating a print head in right and left directions along a carriage shaft to thereby allow the print head and the scanner to perform both scanning and printing operations using one driving apparatus for driving the carriage.

2. Description of the Related Art

Conventional attempts to improve office efficiency and realize office automation have included equipment improvements such as multi-function machines in which various functions, for example, copying, printing, and faxing functions are incorporated in a single body.

Such a multi-function machine is usually provided with a scanner unit having a scanner to scan a document, and a printer unit having a print head or a developing device as an image forming apparatus. Generally, the scanner unit and the printer unit are constructed such that they are separately operated to perform scanning and printing operations, respectively.

Figure 1:
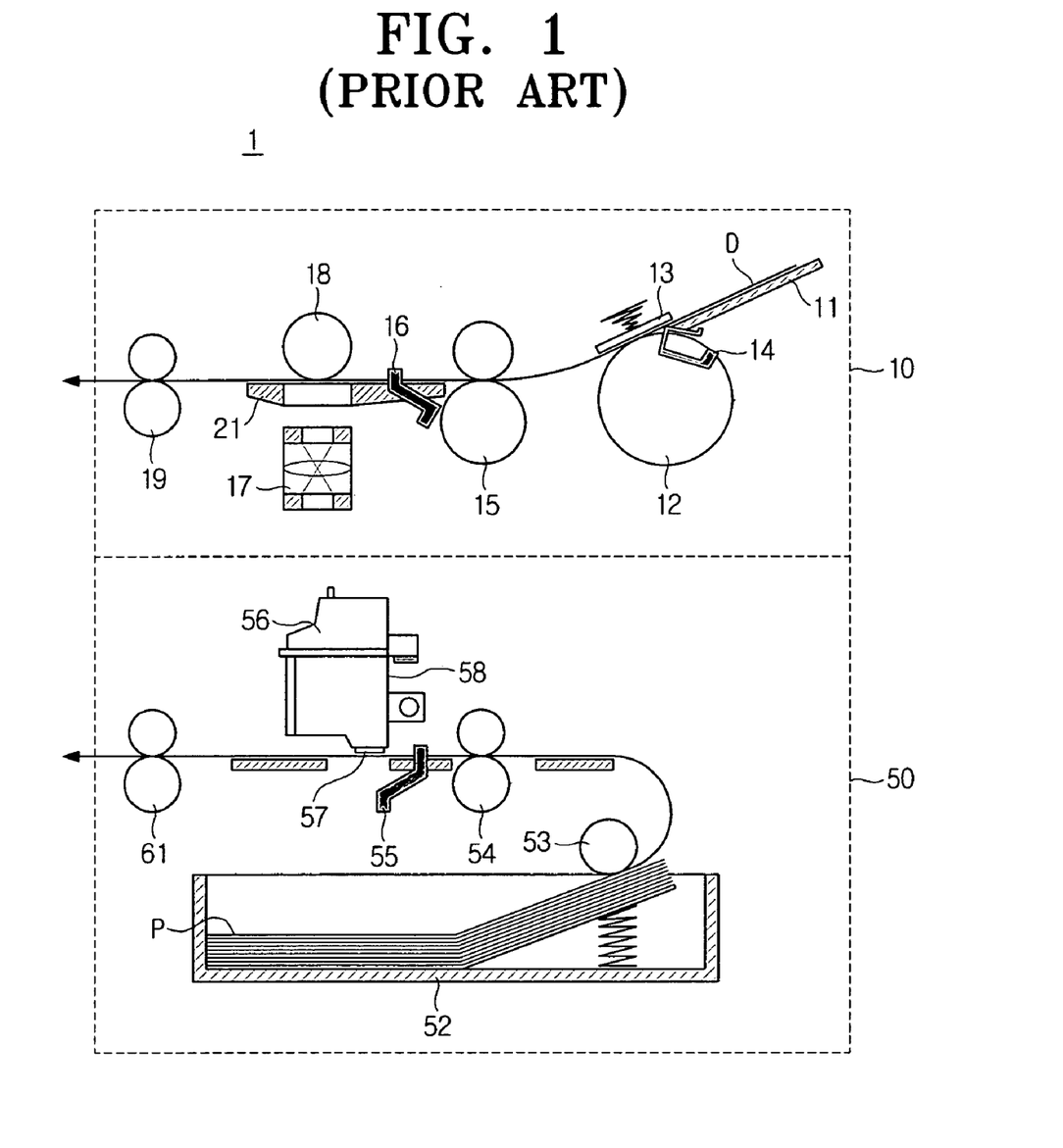
FIG. 1 is a partial cross sectional view of a general inkjet multi-function machine.

Referring to FIG. 1, a partial cross sectional view is provided to illustrate a general inkjet multi-function machine 1 having both scanning and printing functions.

The inkjet multi-function machine 1 comprises a scanner unit 10 to scan documents D, and a printer unit 50 to print data on sheets of paper P.

The scanner unit 10 is provided with a document loading frame 11 comprising a document supply tray for loading documents D, a document sensor 14 to detect whether the documents D are loaded, a document pickup roller 12 to pick up the documents D according to the operation of the document sensor 14, and a document friction pad 13 coming in contact with the document pickup roller 12 at a predetermined pressure to separate and feed documents D one at a time by the friction force therebetween. The scanner unit 10 is further provided with a document feed roller 15 to align a leading end of the documents D, then feed the documents D toward a white roller 18 and thereby bring the documents D into contact with a document guide frame 21 and into an opposing position relative to a scanner 17. Still further, the scanner unit 10 is provided with a scanner 17 to read data from the documents D delivered by the white roller 18, and a document discharge roller 19 to discharge the documents D from the scanner 17 to the outside of the machine.

The printer unit 50 is provided with a paper cassette 52 to stack sheets of paper P, and a paper pickup roller 53 to pick up a sheet of paper P one at a time from the paper cassette 52. The printer unit 50 is further provided with a paper feed roller 54 to align a leading end of the paper P picked up by the paper pickup roller 53 and to feed the sheet of paper P towards a carriage through a paper register sensor 55. Still further, the printer unit 50 is provided with a carriage 58 to reciprocate an ink cartridge 56 in right and left directions, and a paper discharge roller 61 to discharge the sheet of paper P printed by the print head 57 to the outside of the machine. The ink cartridge 56 has a print head 57 to jet ink onto the sheet of paper P fed by the paper feed roller 54.

In such a conventional multi-function machine 1, the scanner 17 and the print head 57 can be independently driven since the scanner unit 10 and the printer unit 50 are constructed to be completely separated from each other. However, since the scanner and print head are respectively driven by separate driving units, there are problems in that machine weight and size are increased, and machine structure becomes more complicated.

Also, in the conventional multi-function machine 1, since the scanner 17 of the scanner unit 10 is used only in the scanning operation, separate sensors are required if the multi-function machine 1 is designed such that during the printing operation of the printer unit 50, functions for detecting head characteristic such as a dot size, a nozzle error and the like, as well as detecting the size and the skew extent of the paper are to be performed.

If the additional separate sensors are installed, the fabrication cost of the multi-function machine 1 is increased still further, thereby adversely effecting the competitive price thereof.

Accordingly, a need exists for a system and method to allow a print head and scanner to perform scanning and printing operations with a minimum of required driving apparatus and sensors.

SUMMARY OF THE INVENTION

Therefore, it is an object of the present invention to provide an inkjet multi-function machine in which a scanner is installed on a carriage for reciprocating a print head in right and left directions along a carriage shaft to thereby allow the print head and the scanner to perform scanning and printing operations, respectively, by using the single driving apparatus provided for driving the carriage. By using the single driving apparatus, the present invention thereby reduces weight and size of the machine, and further simplifies the structure of the machine.

It is another object of the present invention to provide an inkjet multi-function machine in which a scanner is capable of performing operations of detecting head characteristics such as a dot size, a nozzle error and the like, as well as detecting the size and the skew extent of the paper during the printing operation without using separate sensors and thereby further reducing the fabrication cost of the machine.

According to one embodiment of the present invention, to achieve the above objects and other features, the present invention provides an inkjet multi-function machine comprising a scanner unit having a scanner to scan a document, a printer unit having a carriage to move a print head for jetting ink onto a sheet of paper so as to perform the printing operation, and a scanner fixing unit.

The embodiment provides a scanner fixing unit comprising a scanner position adjuster for fixing and supporting the scanner which is further movable between a first position for scanning the document and a second position for scanning the sheet of paper. The scanner fixing unit further comprises a fixer for fixing the scanner position adjuster on the carriage and thereby mounting the scanner on the carriage, wherein the scanner fixing unit fixes the scanner on the carriage allowing the scanner to move together with the carriage when the carriage moves. At the same time, the scanner fixing unit can selectively move the scanner between the first and the second positions.

In an embodiment of the present invention, the scanner position adjuster may further comprise a rotating member fixing the scanner and rotating the scanner between a first and a second direction, the first direction being an orientation where a sensing face of the scanner is directed toward a scan surface of the document, and the second direction being an orientation where the sensing face of the scanner is directed toward a print surface of the paper. The scanner position adjuster may still further comprise a lifting member for ascending and descending the rotating member to maintain the scanner at an appropriate sensing distance with respect to at least one of the document and the sheet of paper.

The rotating member is comprised of a first driving motor having a first rotating axis immovably fixing the scanner thereon, and the lifting member is comprised of a lifting belt fixing the first driving motor thereon. The lifting member is further comprised of a driving pulley and a driven pulley for supporting both ends of the lifting belt, respectively, and rotating the lifting belt to ascend and descend the first driving motor fixed on the lifting belt. The lifting member is still further comprised of a second driving motor having a second rotating axis connected with an axis of the driving pulley.

The fixer may be comprised of a plurality of brackets installed on the carriage to rotatably support ends of an axis of the driven pulley and ends of the axis of the driving pulley, respectively, wherein the axis of the driving pulley is connected with the second rotating axis of the second driving motor.

In yet another embodiment, the scanner position adjuster may comprise a rotating and lifting member fixing the scanner such that the scanner is rotatable between a first and a second direction, the first direction being an orientation where the sensing face of the scanner is directed toward a scan surface of the document, and the second direction being an orientation where the sensing face of the scanner is directed toward a print surface of the paper. The rotating and lifting member fixing the scanner allows the scanner to be rotatable and at the same time, to be ascendable or descendable thereby allowing the scanner to maintain an appropriate sensing distance with respect to at least one of the document and the sheet of paper.

The rotating and lifting member may be comprised of a third driving motor having a third rotating axis, and a lifting part fixing the scanner at the third rotating axis to ascend or descend the scanner according to the rotating operation of the third rotating axis. The lifting part may be comprised of one of a circular disk and a bar immovably fixing the scanner at a radial outer end thereof and fixed vertically to the third rotating axis at an end of the third rotating axis.

Also, the fixer may be comprised of at least one fixing bracket formed at the third driving motor, and at least one screw member fixing the fixing bracket at the carriage.

BRIEF DESCRIPTION OF THE DRAWINGS

The above aspects and other advantages of the present invention will become more apparent by describing in detail a preferred embodiment thereof with reference to the attached drawings, in which.

DETAILED DESCRIPTION OF THE PREFERRED EMBODIMENTS

Hereinafter, an inkjet multi-function machine in accordance with an embodiment of the present invention will be described in detail with reference to the accompanying drawings.

Figure 2:
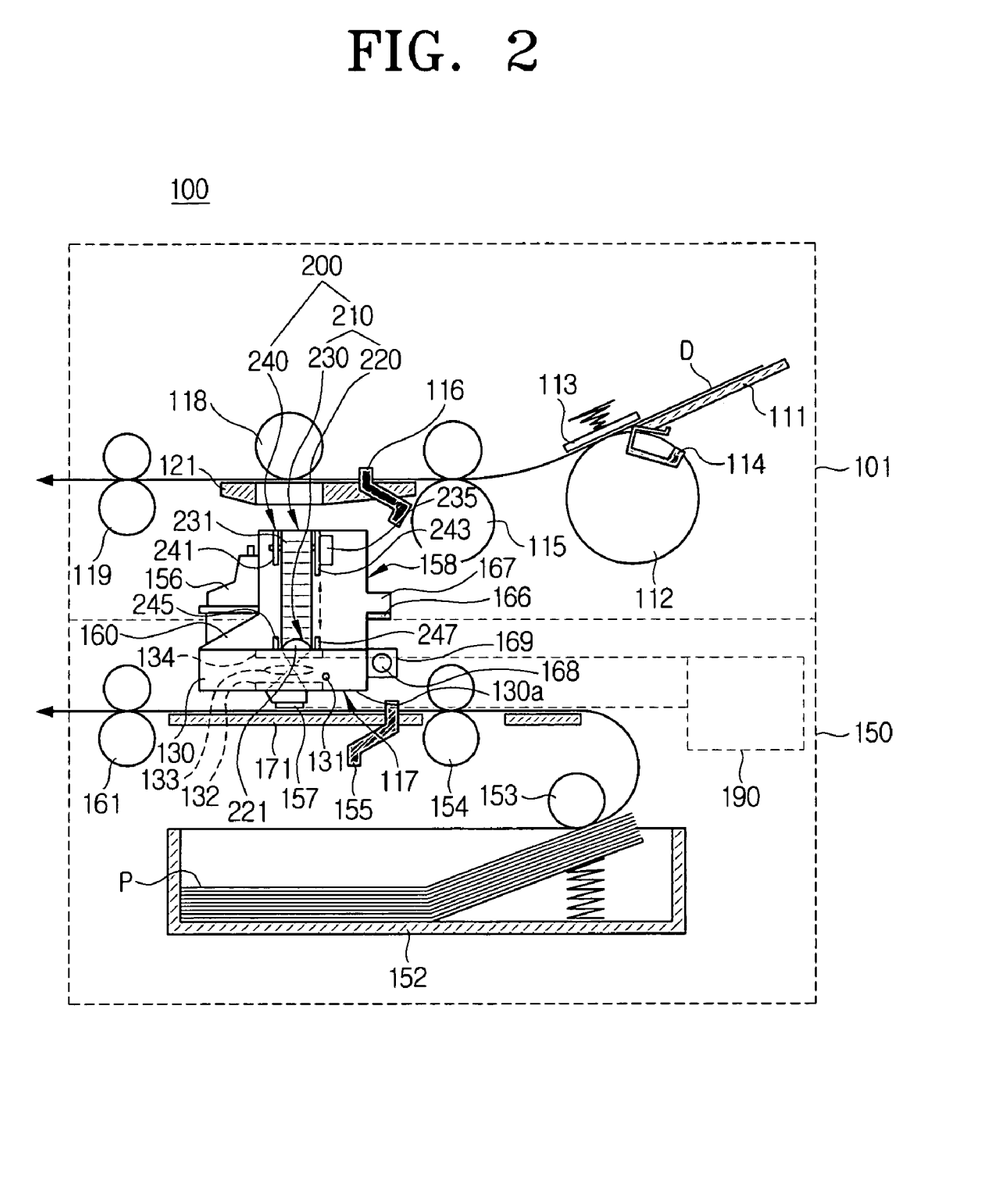
FIG. 2 is a partial cross sectional view of an inkjet multi-function machine having a scanner fixing unit in accordance with an embodiment of the present invention.

Referring to FIG. 2, a partial cross sectional view is provided to illustrate an inkjet multi-function machine 100 having scanning and printing functions in accordance with an embodiment of the present invention.

Figure 3:
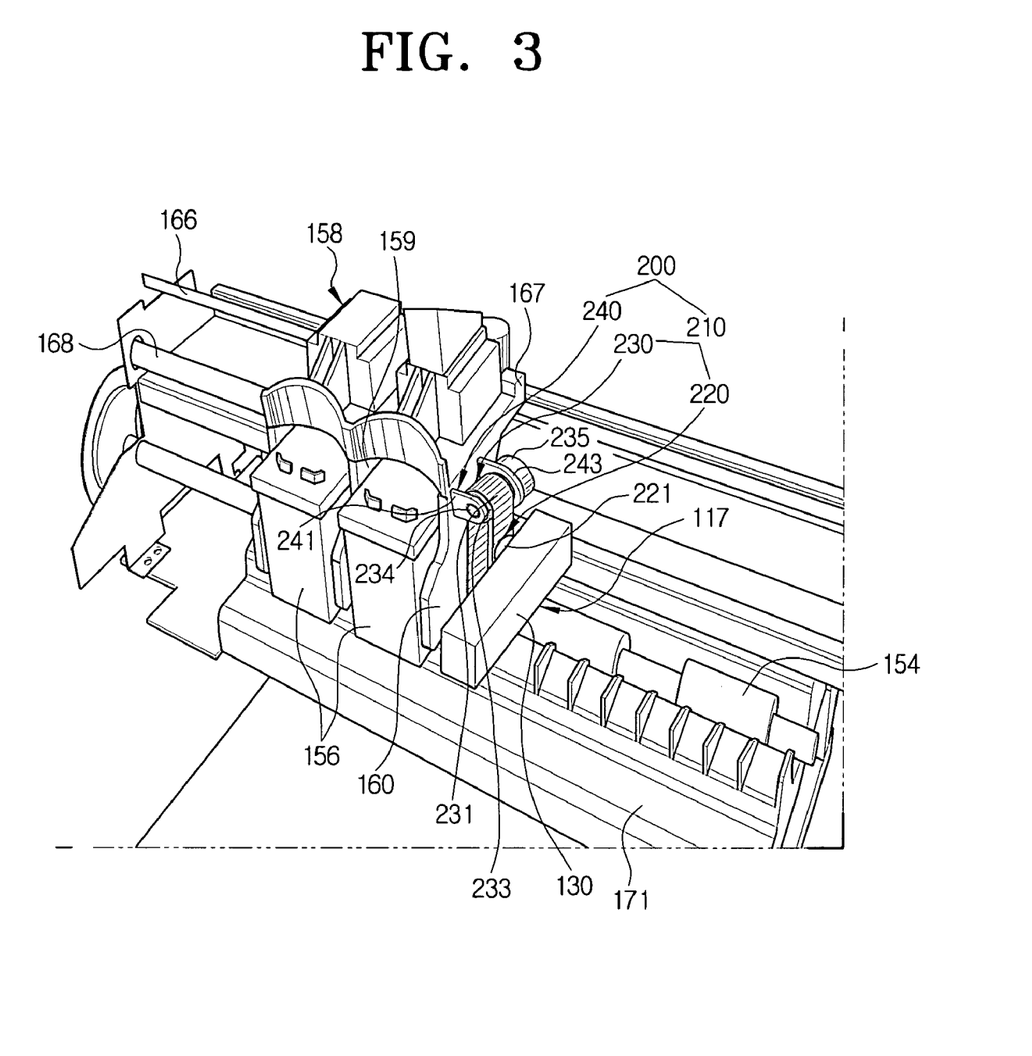
FIGS. 3 and 4 are partial perspective views illustrating the operation of the scanner fixing unit of the inkjet multi-function machine shown in FIG. 2.
Figure 4:
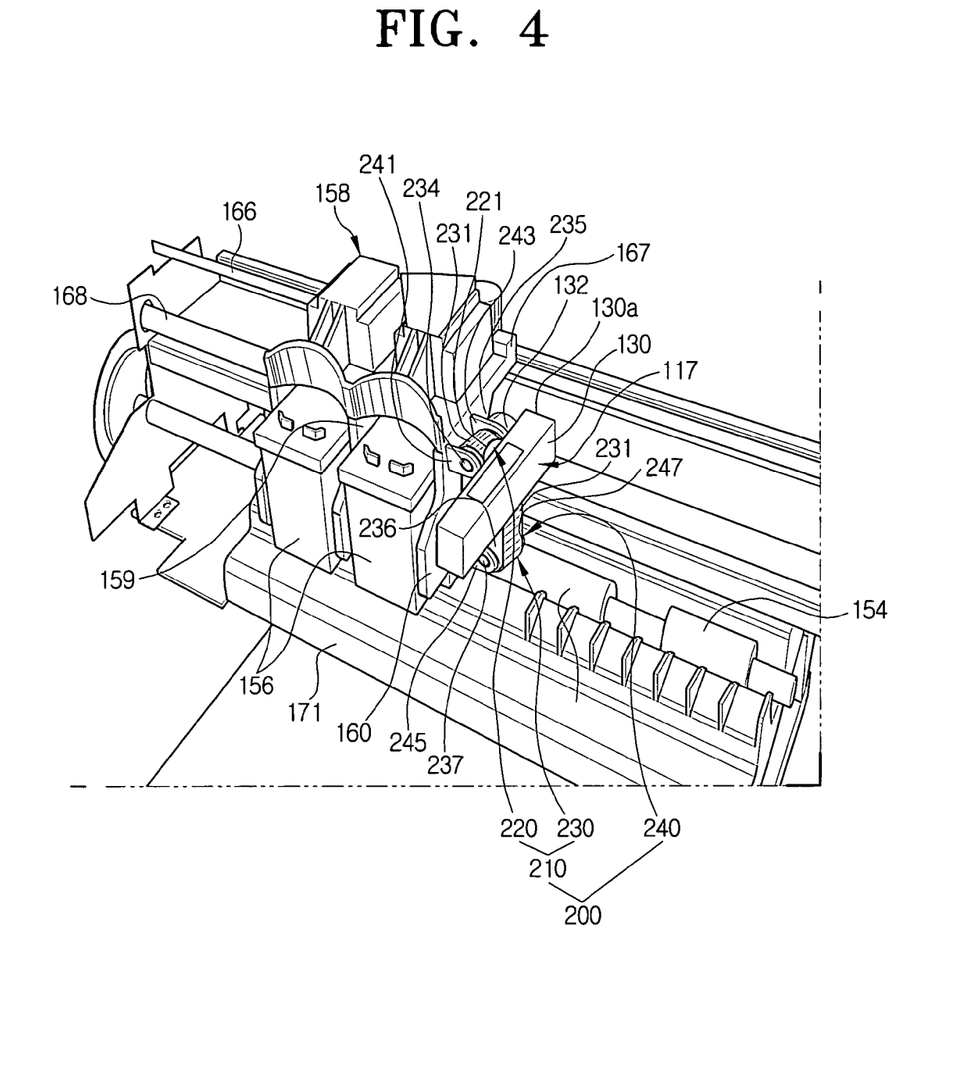

The inkjet multi-function machine 100 comprises a scanner unit 101 having a scanner 117 to scan a document D, a printer unit 150 having a carriage 158 to reciprocate two ink cartridges 156 (as shown in greater detail in FIGS. 3 and 4), each having a print head 157 for jetting ink onto a sheet of paper P in right and left directions to thereby perform the printing operation. The scanner unit 101 further comprises a scanner fixing unit 200 for fixing the scanner 117 on the carriage 158 to allow the scanner 117 to move together with the carriage 158 when the carriage 158 moves, and at the same time, selectively moving the scanner 117 between a first position (as shown in FIG. 4) for scanning the document D, and a second position (as shown in FIGS. 2 and 3) for scanning the sheet of paper P, as occasion demands.

The scanner unit 101 is provided with a document loading frame 111 comprising a document supply tray, a document sensor 114, a document pickup roller 112, a document friction pad 113, a document feed roller 115, a white roller 118, a scanner 117, and a document discharge roller 119. The printer unit 150 is provided with a paper cassette 152, a paper pickup roller 153, a paper feed roller 154, a carriage 158, and a paper discharge roller 161.

The description regarding the component parts of the scanner unit 101 and the printer unit 150, except for the scanner 117 and the carriage 158, will be omitted here as they are substantially identical to that of the conventional components that are described above with reference to FIG. 1.

The scanner 117 is comprised of a rectangle-shaped body 130 rotatably fixed on the carriage 158 by the scanner fixing unit 200. The scanner 117 is further comprised of a scanner glass 132 for transmitting light disposed at a side of a sensing face 130a of the rectangle-shaped body 130, and a lamp 131 for emitting light onto the document D or the sheet of paper P through the scanner glass 132. The scanner 117 is still further comprised of a lens 133 for focusing reflected light, (i.e. image data), from a scan surface of the document D or a print surface of the paper P after receiving light emitted from the lamp 131. The scanner 117 is also comprised of a charge-coupled device (CCD) sensor 134 for transforming light energy received (i.e. image data) through the lens 133, into an electric energy (i.e. voltage) to read the image data.

Usually, the CCD sensor 134 which is used with the scanner 117 uses a size ranging from approximately 128 to approximately 160 dots.

Accordingly, in an example where the document D is of an A4 size (i.e. 2251×3507: 300 dpi basis), the scanner 117 can scan the document D by dividing the document into approximately 22-27 shuttling blocks during the scanning operation.

Also, the scanner 117 can detect head characteristics such as a dot size, a nozzle error and the like, as well as the size and the skew extent of the paper P, and alignment conditions such as a vertical alignment and a horizontal alignment of the print heads 157, without using separate sensors when checking a state of the multi-function machine 100 according to a predetermined control routine during the printing operation, as will be described in greater detail below.

As shown in FIGS. 2, 3 and 4, at a front side of the carriage 158 a cartridge receiving part 159 is formed for mounting the ink cartridges 156, including the print heads 157. At a rear side of the carriage 158 a toothed portion 167 is formed for engaging a driving belt 166 connected to a carriage driving motor (not shown), and a supporting bracket 169 supported on a carriage shaft 168 to be movable in the right and left directions by the driving belt 166.

Also, on one sidewall 160 of the carriage 158, a scanner fixing unit 200 is installed for rotatably and liftably fixing the scanner 117.

The scanner fixing unit 200 comprises a scanner position adjuster 210 for fixing and supporting the scanner 117 to be movable between the first position (as shown in FIG. 4) and the second position (as shown in FIGS. 2 and 3). The scanner fixing unit 200 further comprises a fixer 240 fixing the scanner position adjuster 210 on the one sidewall 160 of the carriage 158, which allows the scanner position adjuster 210 to mount the scanner 117 on the carriage 158.

The first position (as shown in FIG. 4) is a position where the scanner 117 is positioned in a first direction at an ascent position, as described in greater detail below. The second position (as shown in FIGS. 2 and 3) is a position where the scanner 117 is positioned in a second direction at a descent position, as described in greater detail below. Here, the first direction comprises an orientation where the sensing face 130a of the body 130 of the scanner 117 is directed toward a scan surface of the document D. The second direction comprises an orientation where the sensing face 130a of the body 130 of the scanner 117 is directed toward a print surface of the paper P.

The scanner position adjuster 210 is provided with a rotating member 220 for rotatably fixing the scanner 117, and thereby serving to rotate the scanner 117 between the first and second directions, and a lifting member 230 for providing ascending and descending movement of the rotating member 220 having the scanner 117 fixed thereon.

Figure 5:
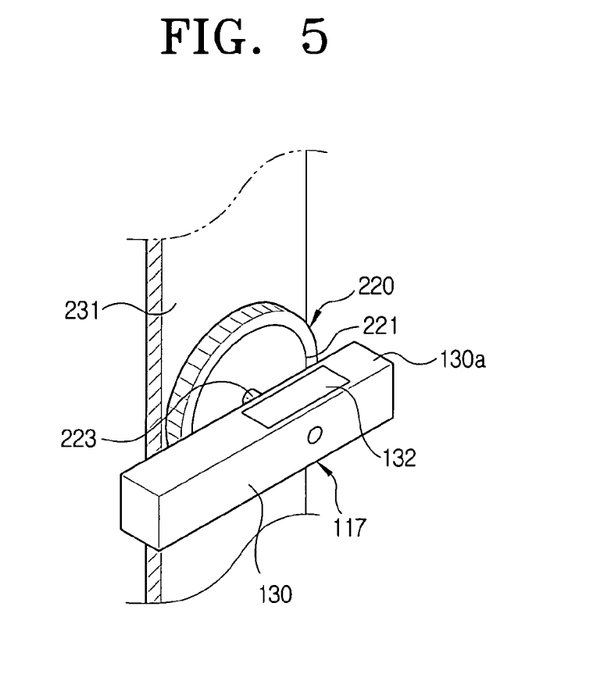
FIG. 5 is a partial perspective view illustrating a rotating member of a scanner position adjuster of the scanner fixing unit shown in FIG. 2.

As shown in FIG. 5, the rotating member 220 is comprised of a first driving motor 221 having a first rotating axis 223 immovably fixed to the body 130 of the scanner 117 to rotate the scanner body. The first driving motor 221 is fixed on a lifting belt 231 of the lifting member 230, described in greater detail below, using an appropriate fixing member (not shown) such as adhesive, rivets, screws and the like.

Accordingly, when the first driving motor 221 rotates in one direction, for example, either in a clockwise or a counterclockwise direction, the body 130 of the scanner 117 fixed on the first rotating axis 223 moves into the first direction (as shown in FIGS. 4 and 5) or into the second direction (as shown in FIGS. 2 and 3).

More specifically, in an example where the scanner 117 is initially positioned in the first direction as shown in FIG. 4, where the sensing face 130a of the body 130 of the scanner 117 is directed upward toward a scan surface of the document D, when the first driving motor 221 rotates at an angle of approximately 180° in the clockwise or the counterclockwise direction, the direction of the scanner 117 fixed on the first rotating axis 223 is changed into the second direction as shown in FIGS. 2 and 3, where the sensing face 130a of the body 130 of the scanner 117 is directed downward toward a print surface of the paper P. In an example where the scanner 117 is initially positioned in the second direction as shown in FIGS. 2 and 3, when the first driving motor 221 rotates at an angle of approximately 180° in the clockwise or the counterclockwise direction, the direction of the scanner 117 is changed into the first direction as shown in FIGS. 4 and 5.

This operation of the rotating member 220 is carried out at an initial position where the scanner 117 maintains an appropriate sensing distance with regards to the document D, that is, the ascent position (as shown in FIG. 4) where the scanner 117 is positioned at an upper part of the one sidewall 160 of the carriage 158 to assure the document D is maintained within a focal distance of the lens 133 of the scanner 117.

The lifting member 230 is comprised of a lifting belt 231 fixing the first driving motor 221 of the rotating member 220 thereon, a driving and a driven pulley 233 and 236, respectively, supporting both ends of the lifting belt 231 and allowing the belt 231 to rotate over each pulley and thereby allow the belt 231 to move the first driving motor 221 attached thereto. Specifically, the belt movement over each pulley serves to ascend and descend the first driving motor 221 fixed on the lifting belt 231. The lifting member 230 is further comprised of a second driving motor 235 having a second rotating axis (not shown) coaxially connected with an axis 234 of the driving pulley 233.

Alternatively, in another embodiment of the present invention, rather than providing the lifting belt 231 and the driving and the driven pulleys 233 and 236, the lifting member 230 can be comprised of a rack (not shown) fixing the first driving motor 221 of the rotating member 220 thereon and installed to be upwardly and downwardly guided along the one sidewall 160 of the carriage 158 by a guide (not shown), and having a pinion engaging with an array of teeth provided by the rack to ascend and descend the first driving motor 221 fixed on the rack. In this embodiment, the lifting member 230 can be further comprised of a driving motor (not shown) coaxially connected with an axis of the pinion to drive the pinion and being fixed on the one sidewall 160 of the carriage 158.

The lifting member 230 functions to ascend and descend the scanner 117 into the ascent position (as shown in FIG. 4) or into the descent position (as shown in FIGS. 2 and 3). As briefly described above, the ascent position is a position where the first driving motor 221 of the rotating member 220 fixing the scanner 117 is maintained at the upper part of the one sidewall 160 of the carriage 158 adjacent the document D to allow the scanner 117 to maintain the appropriate sensing distance with regard to the document D, that is, to allow the document D to be within the focal distance of the lens 133. The descent position is a position where the first driving motor 221 is maintained at a lower part of the one sidewall 160 of the carriage 158 adjacent the sheet of paper P to allow the scanner 117 to maintain an appropriate sensing distance with regard to the sheet of paper P.

More specifically, after the direction of the scanner 117 is changed by the rotating member 220 into the second direction for scanning paper from the first direction for scanning documents, when the second driving motor 235 rotates a predetermined number of rotations in one direction, the lifting belt 231 supported on the driving pulley 233 rotates in the same direction, and thereby the first driving motor 221 fixed on the lifting belt 231 descends downward.

As a result, the scanner 117 fixed on the first rotating axis 233 of the first driving motor 221 moves to the descent position and as a result, is positioned at the lower part of the one sidewall 160 of the carriage 158.

To prevent the scanner 117 from being contaminated by ink jetted from the print head 157 in the printing operation, the operation of moving the scanner 117 while oriented in the second direction into the descent position is carried out only when the state of the multi-function machine 100 is checked according to a predetermined control routine at the beginning of the printing operation.

The result is shown in FIGS. 2 and 3, wherein after checking the state of the multi-function machine 100, the scanner 117 is positioned in the second direction at the descent position where the sensing face 130a of the body 130 of the scanner 117 is directed toward a print surface of the paper P. When the second driving motor 235 rotates a predetermined number of rotations in the other direction, the lifting belt 231 supported on the driving pulley 233 rotates in the same direction, and thereby the first driving motor 221 fixed on the lifting belt 231 ascends upward. As a result, the scanner 117 fixed on the first rotating axis 233 of the first driving motor 221 returns to the ascent position and as a result, is positioned at the upper part of the one sidewall 160 of the carriage 158.

After the scanner 117 moves into the ascent position, the first driving motor 221 of the rotating member 220 rotates at an angle of approximately 180° in the clockwise or counterclockwise direction, and the direction of the scanner 117 returns to the first direction where the sensing face 130a of the body 130 of the scanner 117 is directed toward a scan surface of the document D.

The fixer 240 fixing the scanner position adjuster 210 on the carriage 158 is comprised of a first and second bracket 241 and 243, and a third and fourth bracket 245 and 247, respectively, formed in a spaced-apart relation with each other to rotatably support the ends of the axis 234 of the driving pulley 233, and the ends of the axis 237 of the driven pulley 236 at the upper and lower parts of the one sidewall 160 of the carriage 158.

On the second bracket 243 supporting one end of the axis 234 of the driving pulley 233, the second driving motor 235 is fixed by a fixing member (not shown) such as screws.

Referring again to FIG. 2, the inkjet multi-function machine 100 of the embodiment of the present invention further comprises a controller 190 controlling the operation of the scanner unit 101 and the printer unit 150.

In addition to controlling the operation of the scanner unit 101 and the printer unit 150, the controller 190 also functions to detect the head characteristics such as the dot size, the nozzle error and the like, as well as the size and the skew extent of the paper P. The controller 190 further functions to detect alignment conditions, such as the vertical alignment and the horizontal alignment of the print head 157 by comparing information including an angle, a size and a state of letters or figures printed by the print head 157.

The controller 190 still further functions to detect a twist of the paper P, and a width of the paper P, which are sensed through the scanner 117 at the beginning of the printing operation with data previously input therein including data to print. The controller 190 further functions to transmit the detected results to a device, such as a PC or the like, and at the same time, if detecting an abnormality, to inform an outside user of the detection by displaying an indication message through a display part (not shown) of a control panel (not shown) or providing an alarm through a speaker (not shown).

Thus, in the scanning operation the inkjet multi-function machine 100 of the present invention scans data from the scan surface of the document D through the scanner 117 mounted on the carriage 158 while the carriage 158, having the ink cartridge 156 with the print head 157 mounted thereon, is reciprocated in the right and left directions along the carriage shaft 168 by the driving belt 166. The scanner 117 is positioned in the first direction at the ascent position, as shown in FIG. 4, and then transmits the scanned data to the controller 190 to print through the print unit 150 or to transmit to the PC or the like.

Also, in checking the state of the multi-function machine 100 according to the predetermined control routine at the beginning of the printing operation, the inkjet multi-function machine 100 of the embodiment of the present invention shown senses information including the angle, the size and the state of letters or figures printed by the print head 157, also the twist of the paper P, and the width of the paper P through the scanner 117.

While the carriage 158 is reciprocated in the right and the left directions, after the first driving motor 221 rotates at an angle of approximately 180° to thereby change the direction of the scanner 117 from the first direction to the second direction, the second driving motor 235 of the lifting member 230 rotates a predetermined number of rotations to thereby move the scanner 117 from the ascent position to the descent position as shown in FIGS. 2 and 3. The controller then compares the sensed information with data previously input therein including data to print, and then transmits the compared result to a PC or the like, and at the same time, if an abnormality is detected, the controller informs an outside user of the detection by displaying an indication message through the display part of the control panel or a monitor of the PC, or providing an alarm through a speaker.

Here, it should be noted that in the embodiment of the inkjet multi-function machine 100 of the present invention described above, the operation of checking the state of the multi-function machine 100 is explained as collectively performed according to the predetermined control routine at the beginning of the printing operation. However, the present invention is not limited to this control routine of the embodiment described above. For example, instead of collectively performing the operation of checking the state of the multi-function machine 100 according to the predetermined control routine, in yet another embodiment of the present invention the operation of checking the state of the multi-function machine 100 can be performed only when required, that is, when a user inputs a check command. The user can input such a check command for a portion of subjects, or all subjects regarding the checking of the multi-function machine 100, including the head characteristics, the size of paper, the skew extent of the paper and the like, through an operating button on the control panel, the PC or the like.

Further, in the embodiment of the present invention described above, as a matter of convenience for explanation purposes, the first driving motor 221 of the rotating member 220 is illustrated and explained as being driven only when the scanner 117 is positioned at the ascent position. But if necessary, the first driving motor 221 can be constructed to be driven when the scanner 117 is positioned at the descent position, at an intermediate position between the ascent position and the descent position, or when in motion between the ascent position and the descent position. Particularly, if the first driving motor 221 of the rotating member 220 is driven at the intermediate position, the body 130 of the scanner 117 fixed on the first rotating axis 223 is less likely to be bumped against the document guide frame 121 (as shown in FIG. 2) positioned at an upper side thereof and the paper guide frame 171 positioned at a lower side thereof, and can be smoothly rotated in the range substantially equal to a height of the carriage 158, thereby enhancing the degree of freedom in design.

Also, the inkjet multi-function machine 100 of the embodiment of the present invention is explained as being comprised of only the scanner unit 101 and the printer unit 150, but if necessary, the machine 100 can be constructed to further include a facsimile unit for transmitting and receiving data without greatly modifying or changing the structure of the embodiment of the multi-function machine 100 described above.

The operation of the inkjet multi-function machine 100 according to the embodiments of the present invention constructed as above is described in greater detail below with reference to FIGS. 2 through 5.

First, a copying process in which the scanning and the printing operation are simultaneously performed is explained as follows.

As shown in FIG. 4, at an initial state when the multi-function machine 100 is turned on, the scanner 117 is positioned in the first direction where the sensing face 130a of the body 130 is directed toward the scan surface of the document D, and at the ascent position where the first driving motor 221 of the rotating member 220 fixing the scanner 117 is maintained at the upper part of the one sidewall 160 of the carriage 158 to allow the document D to be within the focal distance of the lens 133.

Under this condition, when documents D are loaded into the document loading frame 111 constituting a document supply tray, the documents D operate the document sensor 114 which turns "ON", so that the controller 190 drives a scanner unit-driving motor (not shown) to rotate the document pickup roller 112.

As a result, the document pickup roller 112 picks up the documents D one by one by using a friction force of the document friction pad 113 coming in contact with the document pickup roller 112 at a predetermined pressure, and thereafter conveys the picked-up documents D to the document feed roller 115.

After that, when a leading end of the picked-up document D operates a document register sensor 116 while passing through the document feed roller 115 after alignment, which is also achieved by the document feed roller 115, the controller 190 stops the scanner unit-driving motor to stop the conveyance of the document D.

At this time, when the user pushes a copying button (not shown), the controller 190 drives a printer unit-driving motor (not shown) to rotate the paper pickup roller 153, and thereby sheets of paper P stacked in the paper cassette 152 are picked up sheet by sheet by the paper pickup roller 153, and then conveyed to the paper feed roller 154.

When a leading end of the picked-up sheet of paper P operates a paper register sensor 155 while passing through the paper feed roller 154 after alignment, which is also achieved by the paper feed roller 154, the controller 190 begins to count a time elapsing from a point of time when the paper register sensor 155 operates. At the same time, the controller 190 drives the scanner unit-driving motor to make the document feed roller 115 and the white roller 118 convey the document D to the scanner 117, and directs the paper feed roller 154 to convey the sheet of paper P to the print head 157.

Thereafter, when a predetermined period of time lapses from the point of time when the paper register sensor 155 operates, that is, when both the document D passes over the scanner 117 by means of the document feed roller 155 and the white roller 118, and the sheet of paper P passes below the print head 157, the controller 190 moves the carriage 158 in the right and left directions in order to carry out the scanning and the printing operations.

As a result, the scanner 117 mounted on the carriage 158 scans data from the document D while moving with the carriage 158, and thereafter transmits the scanned data to the controller 190. The controller 190 directs the printing of data scanned by the scanner 117 by jetting ink onto the sheet of paper P through the print head 157 of the ink cartridge 156 moving in the right and the left directions together with the carriage 158.

After the scanning and the printing operations are finished, a rear end of the document D passes by the document register sensor 116 which turns it "OFF". The controller 190 then checks whether there are any remaining documents loaded in the document loading frame 111 through the document sensor 114. If there is no next document, the controller 190 controls the machine 100 to discharge the document D and the sheet of paper P through the document discharge rollers 119 and the paper discharge roller 161, respectively, and finishes the printing operation. If there are any remaining documents, the controller 190 directs the machine 100 to repeat the operations described above.

Next, the printing operation is explained as follows.

When a printing command is input, such as those received from an outside device such as, for example, a PC or the like, the controller 190 rotates the first driving motor 221 of the rotating member 220 to an angle of approximately 180° according to a previously input control routine. As a result, the scanner 117 is displaced from the first direction where the sensing face 130a of the body 130 is directed toward the scan surface of the document D, to the second direction where the sensing face 130a of the body 130 is directed toward the print surface of the sheet of paper P.

Subsequently, as shown in FIGS. 2 and 3, when the second driving motor 235 of the lifting member 230 rotates in one direction, for example, a counterclockwise direction for a predetermined number of rotations as directed by the controller 190, the scanner 117 is moved to the lower part of the one sidewall 160 of the carrier 158 and positioned in the descent position where the sheet of paper P is maintained within the focal distance of the lens 133 of the scanner 117.

The paper pickup roller 153 is then rotated by the printer unit-driving motor and the sheets of paper P stacked in the paper cassette 152 are picked up sheet by sheet and then conveyed to the paper feed roller 154.

When a leading end of the picked-up sheet of paper P operates the paper register sensor 155 while passing through the paper feed roller 154 after alignment, which is also provided by the paper feed roller 154, the controller 190 begins to count a time elapsing from a point of time the paper register sensor 155 operates.

Thereafter, when a predetermined period of time lapses from the point of time the paper register sensor 155 operates, the controller 190 moves the carriage 158 in the right and left directions and at the same time, controls the print head 157 to print data by jetting ink onto the sheet of paper P fed by the paper feed roller 154 through the print head 157 of the ink cartridge 156 mounted on the carriage 158.

As the carriage 158 reciprocates in the right and the left directions along the carriage shaft 168, the scanner 117 mounted on the carriage 158 senses an angle, a size, and a state of letters or figures printed by the print head 157, and the twist of the paper P, and the width of paper P while moving together with the carriage 158, and then transmits the sensed information to the controller 190.

The controller 190 detects alignment conditions such as a vertical alignment and a horizontal alignment of the print head 157, head characteristic such as a dot size, a nozzle error and the like, as well as the size and the skew extent of the paper P, by comparing the information inputted from the scanner 117 with data previously input therein and data to print. The controller 190 then transmits the detected result to the PC or the like, and at the same time, if an abnormality is detected, the controller informs an outside user of the detection by displaying an indication message through the display part of the control panel or the monitor of the PC, or providing an alarm through the speaker.

After the scanner 117 completes the operation of detecting the information, in order to return the scanner 117 to the original position and thereby prevent it from being contaminated by ink, the controller 190 drives the second driving motor 235 of the lifting member 230 to rotate in an opposite direction, that is, a clockwise direction. As a result, the scanner 117 fixed on the lifting belt 231 of the lifting member 230 returns from the descent position as shown in FIGS. 2 and 3, to the ascent position as shown in FIG. 4.

Subsequently, when the first driving motor 221 of the rotating member 220 is rotated at an angle of approximately 180° by the controller 190, the scanner 117 fixed on the first rotating axis 223 of the first driving motor 221 is displaced from the second direction where the sensing face 130a of the body 130 is directed toward the print surface of the sheet of paper P, to the first direction where the sensing face 130a of the body 130 is directed toward the scan surface of the document D.

After that, when the printing of data is completed, the controller 190 discharges the sheet of paper P through the paper discharge roller 161 and the printing operation is finished.

Next, the scanning operation is explained as follows.

As with the copying process described above, when loaded into the document loading frame 111, a document D then passes through the document pickup roller 112 and the document friction roller 113, by the document sensor 114, though the document feed roller 115, and then operates the document register sensor 116. The controller 190 then stops the scanner unit-driving motor to stop the conveyance of the document D.

At this time, when a scanning button (not shown) is pushed by the user, or a scanning command is input through a device such as a PC or the like, the controller 190 drives the scanner unit-driving motor to direct the document feed roller 115 to convey the document D to the scanner 117.

After that, when the document passes over the scanner 117 by means of the document feed roller 115 and the white roller 118, the carriage 158 reciprocates in the right and the left directions. The scanner 117 mounted on the carriage 158 thereby scans data from the document D while moving together with the carriage 158, and then transmits the scanned data to the controller 190.

The controller 190 then transmits data scanned by the scanner 117 to the PC to store therein.

Figure 6:
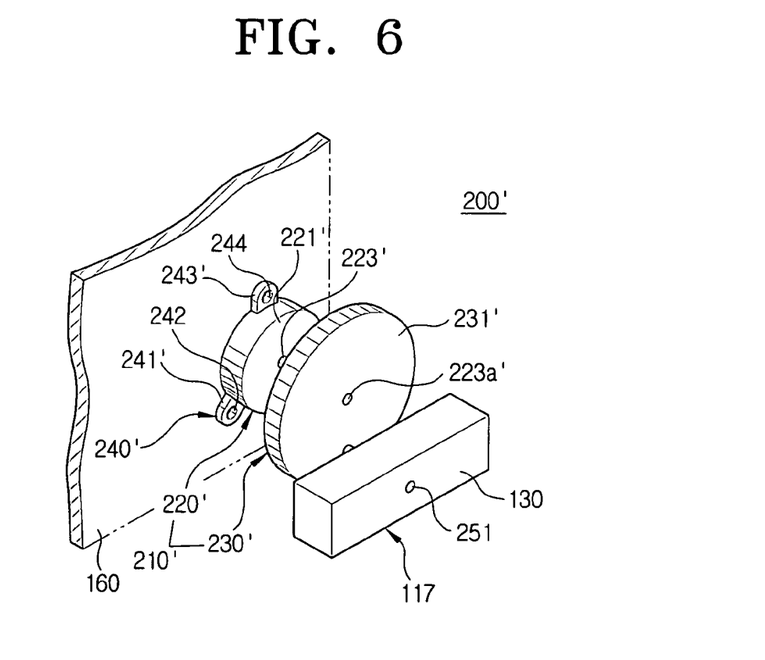
FIGS. 6 and 7 are partial perspective views illustrating the operation of a modified scanner fixing unit that is applied to the inkjet multi-function machine in accordance with an embodiment of the present invention.
Figure 7:
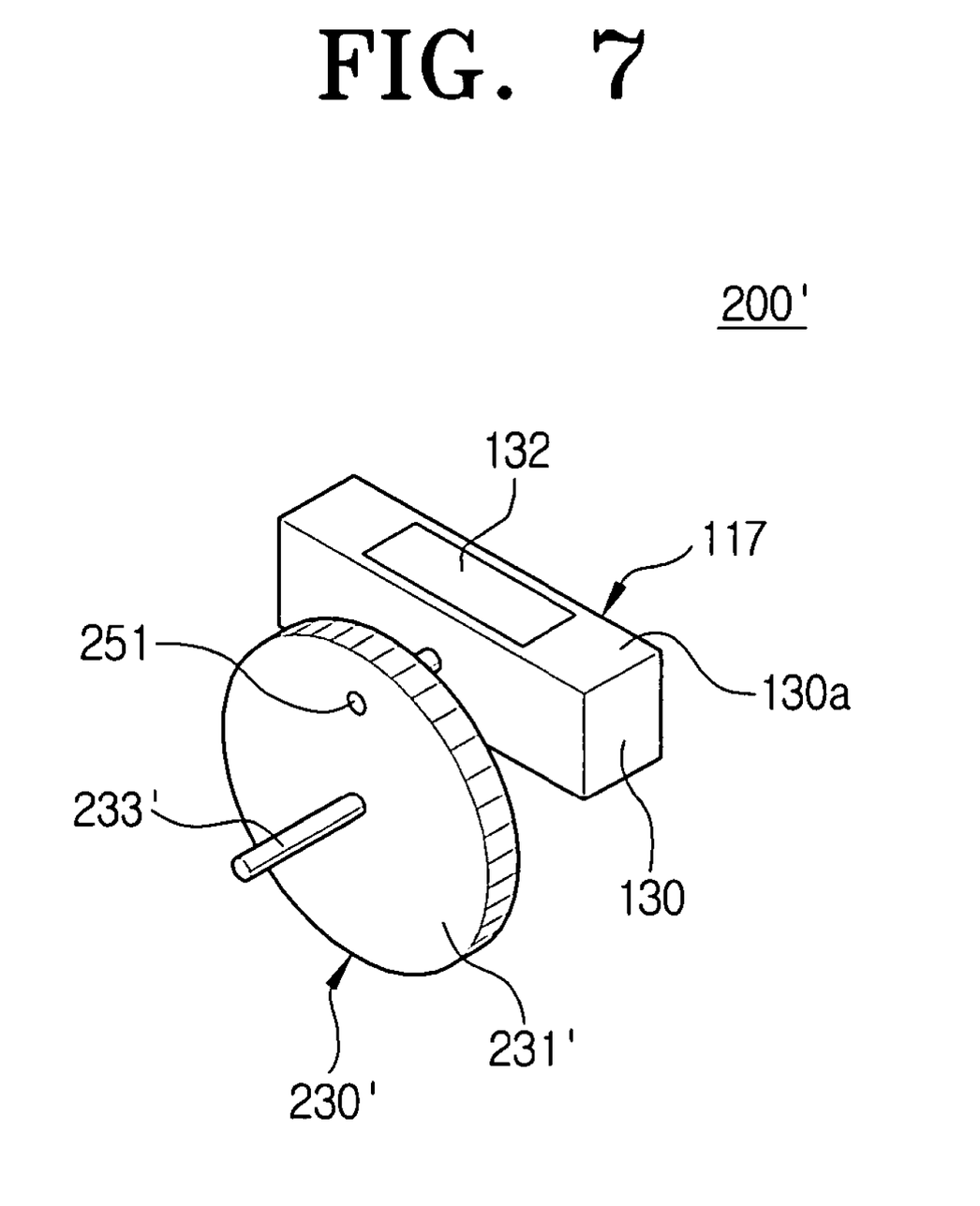

Referring to FIGS. 6 and 7, a perspective view is provided illustrating a modified scanner fixing unit 200' which is applied to the inkjet multi-function machine 100 of another embodiment of the present invention.

The scanner fixing unit 200' comprises a scanner position adjuster 210' provided for fixing and supporting the scanner 117 to be displaceable between a first position (as shown in FIG. 7) and a second position (as shown in FIG. 6), and a fixer 240' provided for fixing the scanner position adjuster 210' on one sidewall 160 of the carriage 158 and serving to mount the scanner 117 on the carriage 158. The first position is a position where the scanner 117 is positioned in a first direction at an ascent position, and the second position is a position where the scanner 117 is positioned in a second direction at a descent position. Here, the first direction means an orientation where the sensing face 130a of the body 130 of the scanner 117 is directed toward the scan surface of the document D, and the second direction means an orientation where the sensing face 130a of the body 130 of the scanner 117 is directed toward the print surface of the paper P.

The scanner position adjuster 210' is comprised of a rotating and lifting member rotatably fixing the scanner 117 to rotate between the first direction (as shown in FIG. 7) and the second direction (as shown in FIG. 6) and at the same time, to ascend or descend the scanner 117 to allow the scanner 117 to maintain an appropriate sensing distance with respect to the document D or the sheet of paper P.

The rotating and lifting member 210' is provided with a third driving motor 221' having a third rotating axis 223', and a lifting part 230' fixing the scanner 117 on the third rotating axis 223' to ascend or descend the scanner 117 when the third rotating axis 223' rotates.

The lifting part 230' is comprised of a circular disk 231' immovably fixing the body 130 of the scanner 117 at a radial outer end thereof and fixed vertically to the third rotating axis 223' at an end 223a' thereof. In the embodiment shown in FIG. 6, the scanner 117 is immovably fixed at the radial outer end of the circular disk 231' by a fixing member such as a pin 251.

Alternatively, in another embodiment of the present invention, the lifting part 230' can be comprised of a bar (not shown) immovably fixing the body 130 of the scanner 117 at a radial outer end thereof and fixed vertically to the third rotating axis 223' at an end 223a' of the third rotating axis thereof, instead of the circular disk 231'.

Accordingly, when the third driving motor 221' rotates, the circular disk 231' fixed at the end 223a' of the third rotating axis 223' rotates, so that the scanner 117 fixed at the radial outer end of the circular disk 231' ascends or descends to the ascent position or the descent position, and at the same time, the direction thereof changes between the first direction (as shown in FIG. 7) where the sensing face 130a of the body 130 of the scanner 117 is directed toward the scan surface of the document D, and the second direction (as shown in FIG. 6) where the sensing face 130a of the body 130 of the scanner 117 is directed toward the print surface of the paper P.

That is, at a state where the scanner 117 is positioned in the first position as shown in FIG. 7, when the third driving motor 221' rotates in one direction, for example, a clockwise or a counterclockwise direction, the scanner 117 is descended to the descent position by the movement of the circular disk 231' and the direction thereof is displaced to the second direction as shown in FIG. 6. At a state where the scanner 117 is positioned in the second position as shown in FIG. 6, when the third driving motor 221' rotates in the clockwise or counterclockwise direction, the scanner 117 is ascended to the ascent position and at the same time, the direction thereof is displaced to the first direction as shown in FIG. 7.

Also, the fixer 240' provided for fixing the scanner position adjuster 210' on the one sidewall 160 of the carriage 158, is comprised of a first and a second fixing bracket 241' and 243', respectively. The fixing brackets 241' and 243' are formed at the third driving motor 221', and screw members 242 and 244 are provided for fixing the first and the second fixing bracket 241' and 243' to the one sidewall 160 of the carriage 158.

The description regarding the operation of the inkjet multi-function machine having the modified scanner fixing unit 200' constructed as above will not be explained here as it is performed in the same manner as the operation of the inkjet multi-function machine 100 having the scanner fixing unit 200 described above with reference to FIGS. 2 through 4.

As apparent from the foregoing description, it can be appreciated that the inkjet multi-function machine according to the embodiments of the present invention enables the print head and the scanner to perform the scanning and printing operations, respectively, by one driving apparatus provided for driving the carriage, thereby reducing weight and size, and simplifying structure by installing the scanner on the carriage provided for reciprocating the print head in right and left directions along the carriage shaft.

Also, in the inkjet multi-function machine of the present invention, the operations of sensing the head characteristics such as the dot size, the nozzle error and the like, as well as the size and the skew extent of the paper, can be performed by the scanner without using separate sensors during the printing operation, thereby fabrication cost can also be reduced.

Although only a few exemplary embodiments of the present invention have been illustrated and described in detail above, it will be understood by those skilled in the art that the present invention should not be limited to the described exemplary embodiments, but various changes and modifications can be made within the spirit and scope of the present invention without materially departing from the novel teachings and advantages of this invention. Accordingly, all such modifications are intended to be included within the scope of this invention as defined by the appended claims.

What is claimed is:

1. An inkjet multi-function machine for scanning and printing in which a print head and scanner can more effectively perform both a scanning and a printing operation by using cooperative positioning, the machine comprising:
   a scanner unit having a rotatable scanner so as to perform a scanning operation, the rotatable scanner comprising at least one sensing face;
   a printer unit having a carriage to move a print head for jetting ink onto a sheet of paper so as to perform a printing operation; and
   a scanner fixing unit comprising a scanner position adjuster for fixing and supporting the rotatable scanner to be movable between a first position for scanning a document in the scanning operation, and a second position for scanning a sheet of paper in the printing operation,
   said scanner fixing unit further comprising a fixer for fixing the scanner position adjuster on the carriage to allow the rotatable scanner to move together with the carriage when the carriage moves, and at the same time, to allow the scanner position adjuster to selectively move the rotatable scanner between the first and the second position.

2. The inkjet multi-function machine as claimed in claim 1, wherein the document comprises at least one scan surface from which data is received.

3. The inkjet multi-function machine as claimed in claim 1, wherein the paper comprises at least one print surface upon which data is transferred.

4. The inkjet multi-function machine as claimed in claim 1, wherein the scanner position adjuster comprises:
   a rotating member for fixing and supporting the rotatable scanner to be rotatable between a first and a second direction, the first direction being a scanner orientation wherein the sensing face of the rotatable scanner is directed toward a scan surface of the document, and the second direction being a scanner orientation wherein the sensing face of the rotatable scanner is directed toward a print surface of the paper; and
   a lifting member for ascending and descending the rotating member between the first and second position to maintain the rotatable scanner at a desired sensing distance with respect to at least one of the document and the sheet of paper.

5. The inkjet multi-function machine as claimed in claim 4, wherein the rotating member comprises a first driving motor having a first rotating axis for immovably fixing the rotatable scanner thereon.

6. The inkjet multi-function machine as claimed in claim 5, wherein the lifting member comprises:
   a lifting belt for fixing the first driving motor thereon, the lifting belt having a first and second end;
   a driving and a driven pulley each having an axis, for supporting the first and second ends of the lifting belt, respectively, and for rotating the lifting belt along a path between the driving and driven pulleys to ascend and descend the first driving motor fixed on the lifting belt; and
   a second driving motor having a second rotating axis connected with an axis of the driving pulley.

7. The inkjet multi-function machine as claimed in claim 6, wherein the fixer comprises:
   a plurality of brackets installed on the carriage to rotatably support the ends of the axis of the driven pulley and the ends of the axis of the driving pulley, wherein the axis of the driving pulley is further connected with the second rotating axis of the second driving motor.

8. The inkjet multi-function machine as claimed in claim 1, wherein the scanner position adjuster comprises:
   a rotating and lifting member for fixing and securing the rotatable scanner to be rotatable between a first and a second direction, the first direction being a scanner orientation wherein the sensing face of the rotatable scanner is directed toward a scan surface of the document, and the second direction being a scanner orientation wherein the sensing face of the rotatable scanner is directed toward a print surface of the paper; and
   said rotating and lifting member further provided for fixing and securing the rotatable scanner to be ascendable or descendable to allow the rotatable scanner to maintain a desired sensing distance with respect to at least one of the document and the sheet of paper.

9. The inkjet multi-function machine as claimed in claim 8, wherein the rotating and lifting member comprises:
   a third driving motor having a third rotating axis; and a lifting part for fixing the rotatable scanner on the third rotating axis to ascend or descend the rotatable scanner according to the rotating operation of the third rotating axis.

10. The inkjet multi-function machine as claimed in claim 9, wherein the lifting part comprises:
   at least one of a circular disk and a bar for immovably fixing the rotatable scanner at a radial outer end thereof and fixed vertically to the third rotating axis at an end of the third rotating axis.

11. The inkjet multi-function machine as claimed in claim 10, wherein the fixer comprises:
   at least one fixing bracket formed at the third driving motor; and
   at least one screw member for fixing the fixing bracket at the carriage.

12. A method for performing an inkjet machine function, such as scanning and printing, in which a print head and scanner can more effectively perform by using cooperative positioning, the method comprising:
   securing at least one scanner unit to a printer carriage unit via a scanner fixing unit, said fixing unit provided to communicate at least one of a first, second and third linear motion and a first rotational motion to said scanner unit;
   controlling said scanner to travel between a first position for scanning a document, and a second position for scanning a sheet of paper via said first linear motion, further controlling said scanner to rotate between a first direction for scanning a document, and a second direction for scanning a sheet of paper via said first rotational motion; and
   controlling said printer carriage to travel via said second and third linear motion for achieving at least one function comprising printing a sheet of paper, scanning a sheet of paper and scanning a document.

13. A method for performing a function, such as scanning and printing, as claimed in claim 12, wherein said first and second linear motion are orthogonal.

14. A method for performing a function, such as scanning and printing, as claimed in claim 12, wherein said second and third linear motion are orthogonal.

15. A system for performing an inkjet machine function, such as scanning and printing, in which a print head and scanner can more effectively perform by using cooperative positioning, the system comprising:
   at least one scanner unit fixed to a printer carriage unit via a scanner fixing unit, said fixing unit provided to communicate at least one of a first, second and third linear motion and a first rotational motion to said scanner unit;
   at least one controller provided to control said scanner to travel between a first position for scanning a document, and a second position for scanning a sheet of paper via said first linear motion, said controller further provided for controlling said scanner to rotate between a first direction for scanning a document, and a second direction for scanning a sheet of paper via said first rotational motion; and
   at least one printer carriage to travel via said second and third linear motion for achieving at least one function comprising printing a sheet of paper, scanning a sheet of paper and scanning a document.

* * * * *